(12) United States Patent  
Sadarangani et al.

(10) Patent No.: US 6,717,297 B2
(45) Date of Patent: Apr. 6, 2004

(54) ELECTRICAL MACHINE

(75) Inventors: Chandur Sadarangani, Västerås (SE); Lars Gertmar, Västerås (SE); Waqas Arshad, Norsborg (SE)

(73) Assignee: ABB AB, Västeras (SE)

( * ) Notice: Subject to any disclaimer, the term of this patent is extended or adjusted under 35 U.S.C. 154(b) by 0 days.

(21) Appl. No.: 10/240,724

(22) PCT Filed: Apr. 6, 2001

(86) PCT No.: PCT/SE01/00774
§ 371 (c)(1),
(2), (4) Date: Oct. 7, 2002

(87) PCT Pub. No.: WO01/78219
PCT Pub. Date: Oct. 18, 2001

(65) Prior Publication Data
US 2003/0048019 A1 Mar. 13, 2003

(30) Foreign Application Priority Data
Apr. 7, 2000 (SE) .............................................. 0001302

(51) Int. Cl.⁷ ........................ H02K 33/00; H02K 33/14; H02K 33/10
(52) U.S. Cl. ............................. 310/14; 310/14; 310/30; 310/23; 310/34
(58) Field of Search .............................. 310/12–14, 23, 310/30, 34

(56) References Cited

U.S. PATENT DOCUMENTS

| 5,117,142 A | * | 5/1992 | von Zweygbergk | 310/156.02 |
|---|---|---|---|---|
| 5,276,372 A | * | 1/1994 | Hammer | 310/24 |
| 5,347,186 A |   | 9/1994 | Konotchick | 310/17 |
| 5,598,044 A |   | 1/1997 | Satomi et al. | 310/12 |
| 5,693,991 A | * | 12/1997 | Hiterer et al. | 310/30 |
| 5,696,413 A | * | 12/1997 | Woodbridge et al. | 310/15 |
| 5,734,209 A | * | 3/1998 | Hallidy | 310/12 |
| 5,788,003 A |   | 8/1998 | Spiers | 150/65.2 |
| 5,854,521 A |   | 12/1998 | Nolle | 310/12 |
| 5,924,975 A | * | 7/1999 | Goldowsky | 600/16 |
| 6,079,960 A | * | 6/2000 | Funatsu et al. | 417/488 |
| 6,246,561 B1 | * | 6/2001 | Flynn | 361/147 |
| 6,326,706 B1 | * | 12/2001 | Zhang | 310/12 |
| 6,501,357 B2 | * | 12/2002 | Petro | 335/229 |

FOREIGN PATENT DOCUMENTS

| DE | 19811075 | 9/1999 | H02K/21/02 |
|---|---|---|---|
| EP | 0120986 | 10/1984 | H02K/35/04 |

* cited by examiner

Primary Examiner—Thomas M. Dougherty
Assistant Examiner—J. Aguirrechea
(74) Attorney, Agent, or Firm—Oblon, Spivak, McClelland, Maier & Neustadt, P.C.

(57) ABSTRACT

An electrical machine with at least a machine unit. This machine unit includes a stator, which includes a plurality of magnetic flux conductors, an electric conductor forming a winding extending in a substantially closed winding path through each magnetic flux conductor, and a least one first movable element, which includes a number of permanent magnet elements and which is movable in a reciprocating movement in relation to the stator along a first movement path in a space having a finite length and formed by at least some of the magnetic flux conductors. The winding path includes a first current carrying portion, which extends substantially in parallel with the first movement path. Each magnetic flux conductor is arranged to form, together with one of the permanent magnetic elements, a closed magnetic flux circuit extending around the current carrying portion.

12 Claims, 8 Drawing Sheets

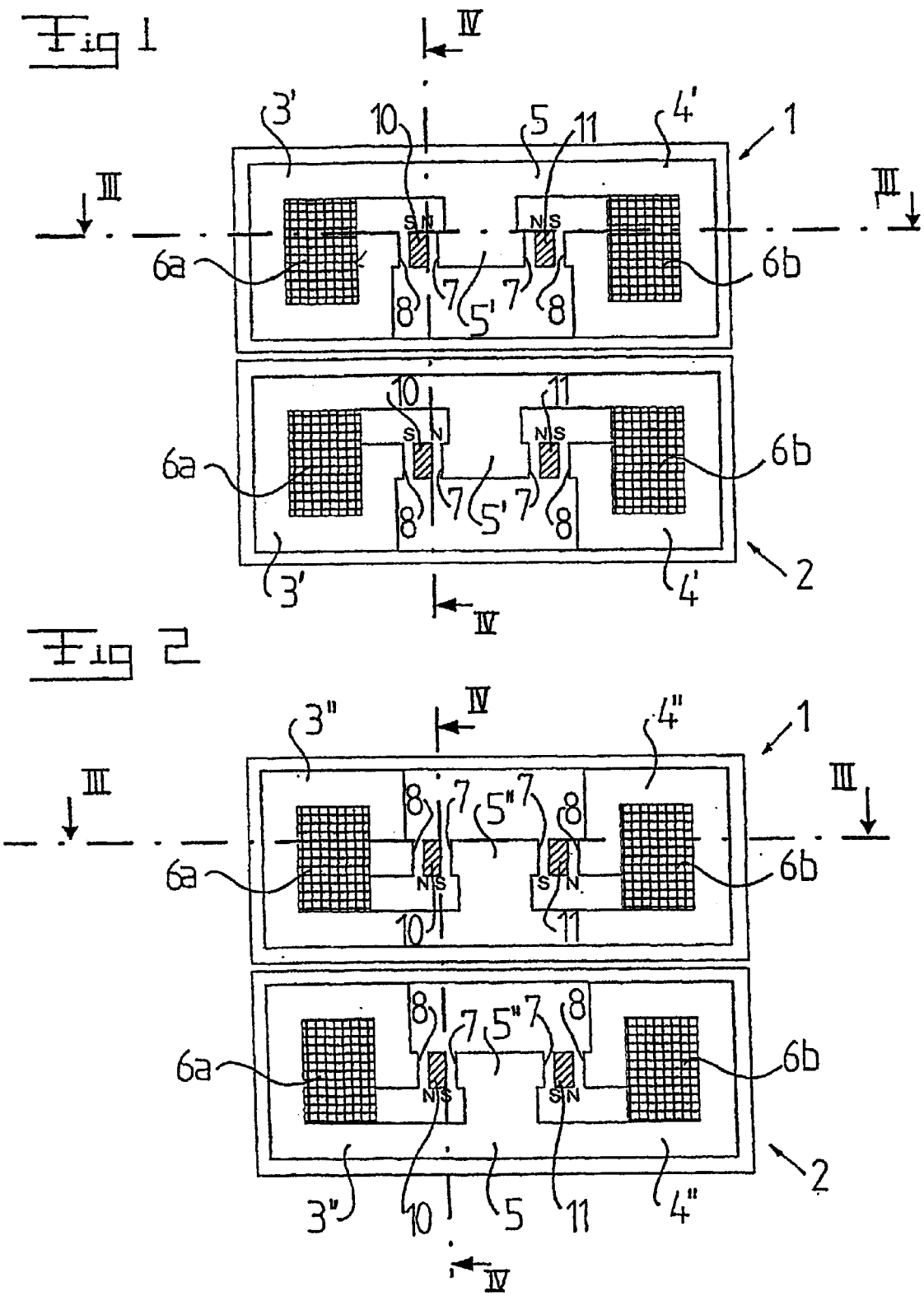

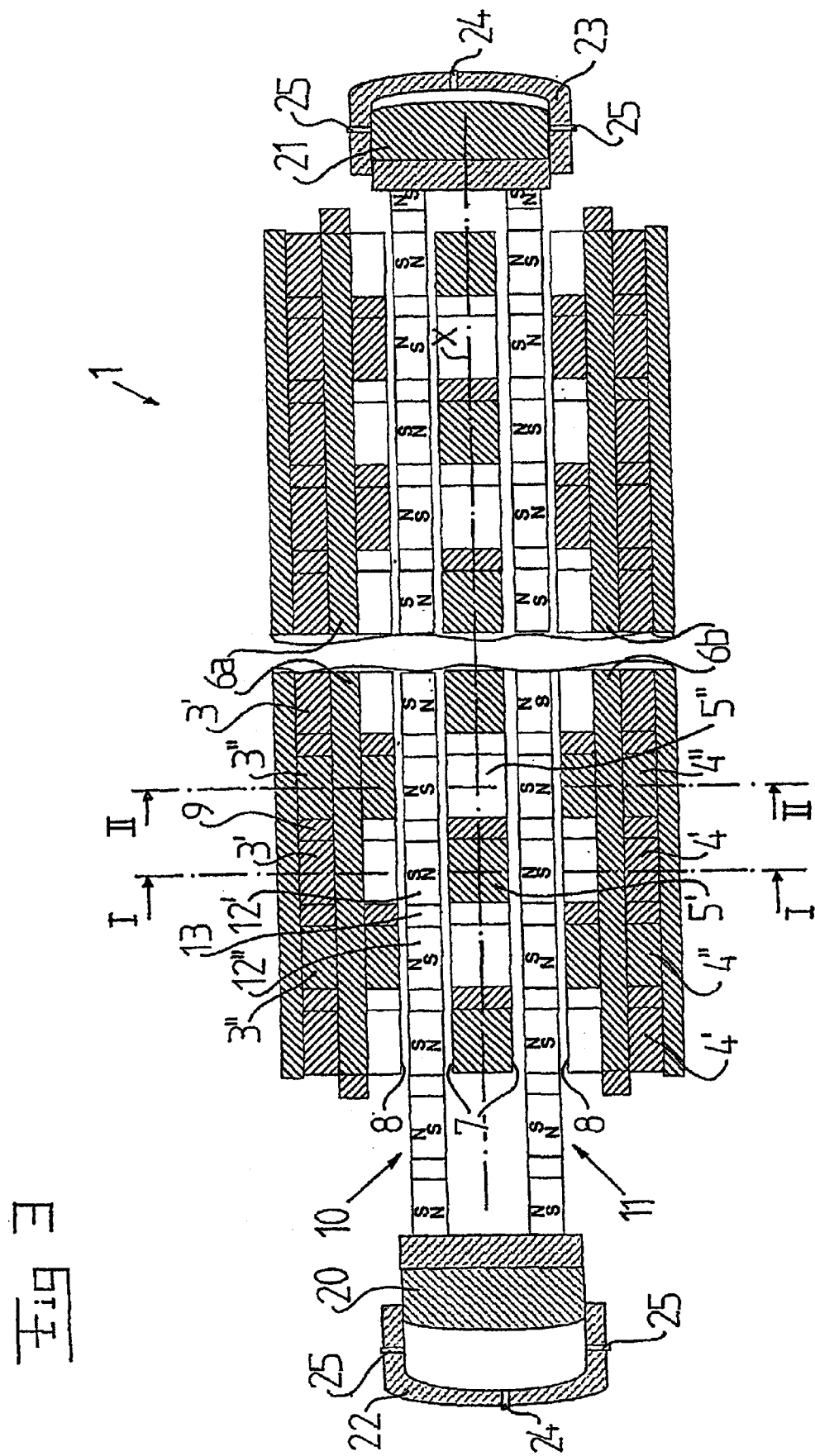

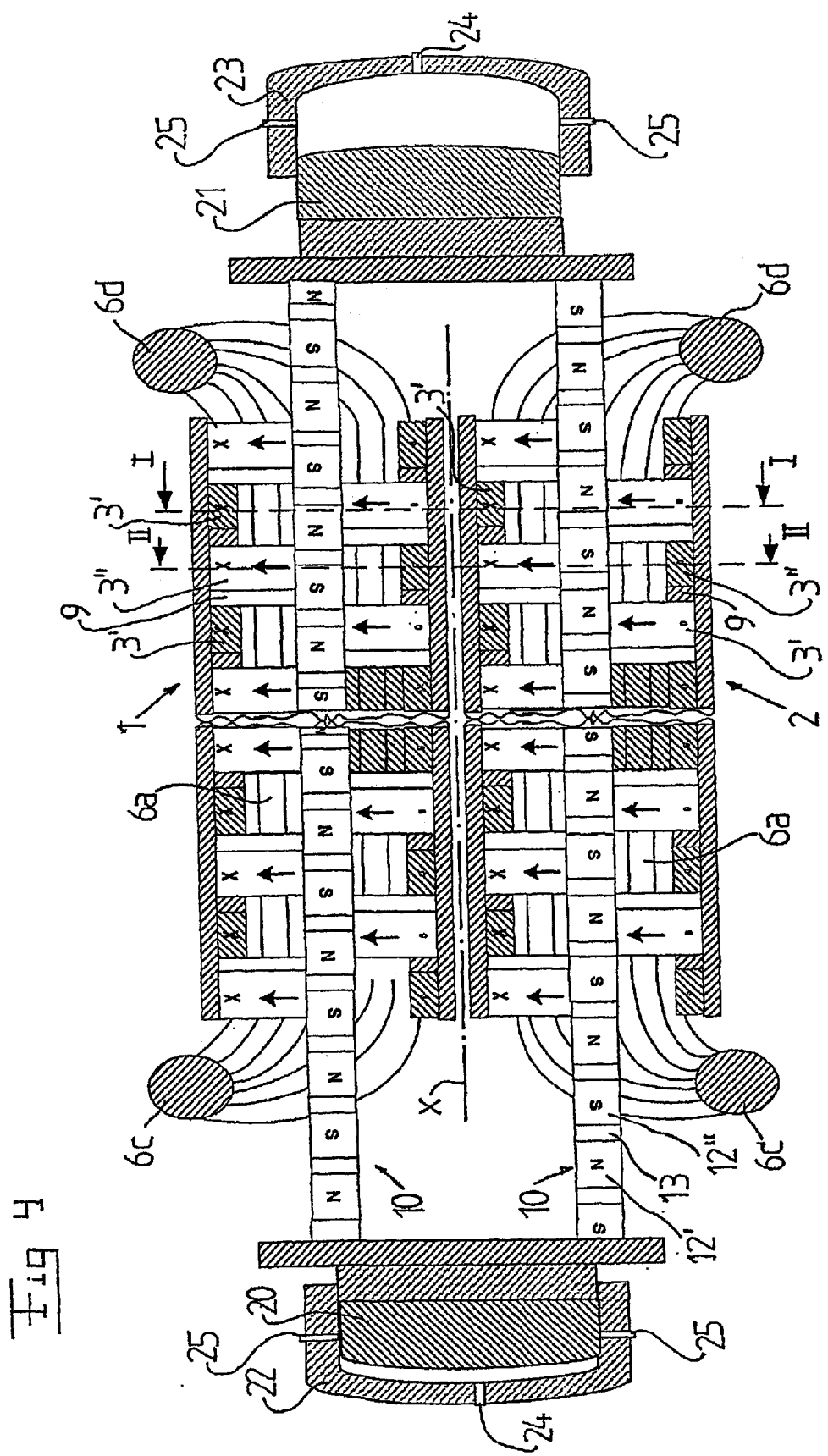

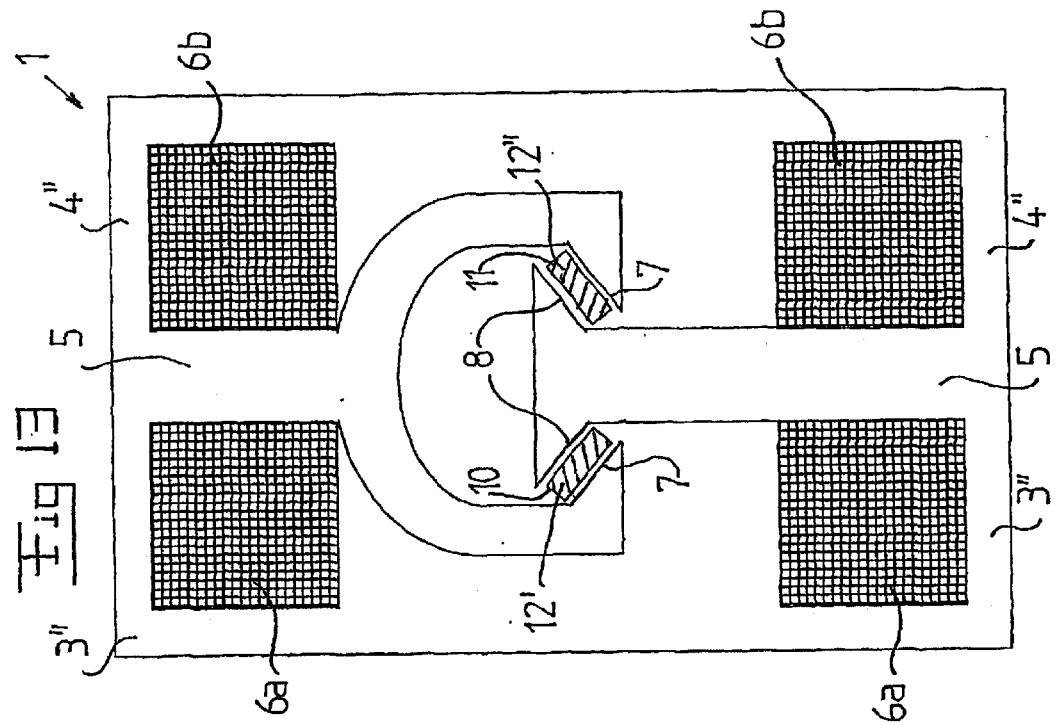
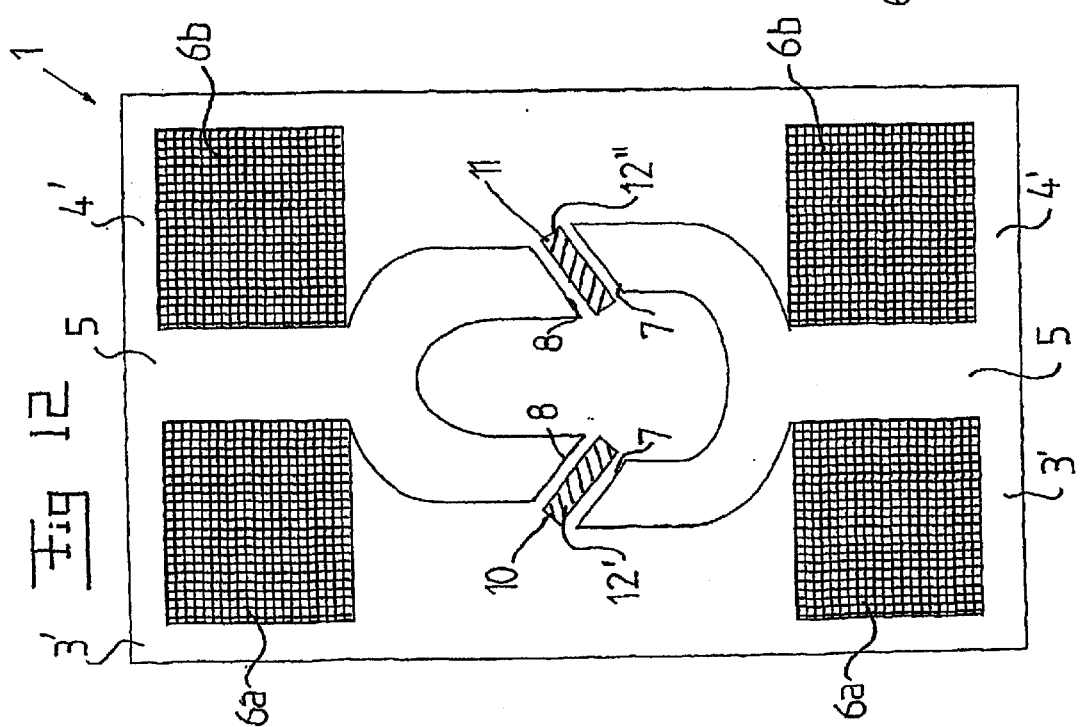

ELECTRICAL MACHINE

THE BACKGROUND OF THE INVENTION AND PRIOR ART

The present invention refers to an electrical machine including a stator, which has magnetic flux conductors and a winding extending through said magnetic flux conductors, and at least one movable element, which is movable in relation to the stator.

Linear electrical machines are known in various connections, for instance as free-piston engines, i.e. an engine with a piston, which is mechanically freely movable in a cylinder housing. Consequently, there is no mechanical element, such as a connecting rod or a crank shaft, for the transfer of energy from the piston, but the kinetic energy of the piston is transformed directly to electrical energy by means of the linear electrical machine. Such a linear generator could, for instance, include a magnetic element in the piston and an electromagnetic element in the wall of the cylinder housing.

U.S. Pat. No. 5,788,003 discloses such a combustion engine of a free-piston type for driving a motor vehicle. The engine co-operates with an integrated electric generator, wherein the piston, which has an inner electrically conducting winding, is arranged to perform a reciprocating movement in relation to a surrounding outer winding. During operation, the outer winding produces a magnetising field, wherein electric effect is generated in the inner winding. The generated electric effect is obtained from the inner winding by a mechanical commutator, wherein the electric effect then may be used by an electric motor for driving the vehicle. Such a commutator is subjected to wear and has a limited life time.

U.S. Pat. No. 5,347,186 refers to a linear electric generator in which a magnet and a winding are provided to move in relation to each other. The relative movement of the winding in the magnetic field generates a current in the winding, which may be used by an external current circuit. This document describes the basic principles for magnetic induction, a phenomenon which has been known since very long ago. The new matter appears to be a member, which is intended to maintain a neutral position for the relative movement.

Conventional electrical machines operate according to the longitudinal flux principle, which means that the magnetic flux plane of each stator element is parallel to the moving direction of the rotor. SE-B-463 061 discloses an electrical machine, which operates according to the transversal flux principle. This known machine includes a rotor with a number of permanent magnets and a stator with a corresponding number of stator elements, which are provided in such a manner that the induced magnetic flux mainly follows a path perpendicular to the rotary direction of the rotor. The known machine is characterised by a high effect density, i.e. a high effect in relation to the volume of the machine is obtained. The document discloses rotary machines with a transversal flux. Certainly, a linear design is disclosed in the document but merely for an illustrating purpose. The document gives no information about how the transversal principle can be transferred to linear machines, and in particular not, to linear machines with an element describing a reciprocating movement in relation to the stator.

DE-A-198 11 075 discloses a linear electric machine having a stator with a plurality of magnetic flux conductors and a movable element with a number of permanent magnet elements. A closed winding path extends substantially in parallel to the moving direction of the movable element. Each magnetic flux conductor forms together with a permanent magnet element a closed magnetic flux circuit. The direction of the magnetic flux is the same in each circuit along the movable element, and thus the magnetic flux conductors are provided at a distance from each other, which corresponds to the width of a permanent magnet element.

SUMMARY OF THE INVENTION

The object of the present invention is to provide an improved electrical machine with a stator and a reciprocating movable element. In particular, it is aimed at such a machine with a high efficiency.

This object is obtained by an electrical machine including at least one first machine unit, which includes a stator, which includes a plurality of magnetic flux conductors and an electric conductor forming a winding extending in a substantially closed winding path through each magnetic flux conductor, and at least one first movable element, which includes a number of permanent magnet elements and which is movable in a reciprocating movement in relation to the stator along a first movement path in a space having a finite length and being formed by at least some of said magnetic flux conductors, wherein the substantially closed winding path includes a first current carrying portion, which extends substantially in parallel with the movement path, wherein each magnetic flux conductor is arranged to form, together with one of said permanent magnet elements, a closed magnetic flux circuit extending around said current carrying portion, and wherein the magnetic flux conductors are arranged in an alternating order with respect to the direction of the magnetic flux in relation to the permanent magnet elements in the respective magnetic flux circuit.

By such a design, an electrical machine is obtained, which operates according to the transversal flux principle and which includes a reciprocating movable element that advantageously may form or be fixedly connected to a piston of a mechanical machine such as an engine or a pump. Thanks to the extension of the winding in a substantially closed winding path through each magnetic flux conductor of the stator, the total quantity of the winding may be reduced, which leads to small losses. Furthermore, the magnetic flux conductors of the stator may be arranged relatively closed to each other, which provides a high effect density with regard to the weight as well as the volume of the electrical machine. In such a way, a high efficiency of the electrical machine may be obtained.

Thanks to the alternating order, it is ensured that the voltage induced in the winding at each point of time has the same direction, and that the voltage through the winding changes direction simultaneously for each magnetic flux circuit when the movable element moves in such a way that the permanent magnet elements moves one step with regard to the magnetic flux conductors.

According to an embodiment of the invention, each magnetic flux circuit includes a magnetic flux, which is in parallel with a plane extending substantially perpendicularly to the movement path. The distance between a centre point of adjacent permanent magnet elements may thereby be substantially equal to the distance between a centre point of adjacent magnetic flux conductors. In such a way, the electrical machine according to the invention will, along a certain length of the stator, include the same number of stator elements, i.e. magnetic flux conductors, as permanent magnet elements of the movable element. Consequently, a high effect density of the electrical machine is obtained. Such a design may be provided by arranging the permanent magnet elements in an alternating order with respect to the magnetic direction of the permanent magnet elements.

According to a further embodiment of the invention, each magnetic flux circuit includes a first gap between a pole of the permanent magnet element of the circuit and an end surface of the magnetic flux conductor of the circuit, and a second gap between a second pole of the permanent magnet element of the circuit and a second end surface of the magnetic flux conductor of the circuit. The permanent magnet elements may thereby be arranged in such a way that the magnetic direction extends substantially perpendicularly to the moving direction of the movable element in the movement path. In such a manner, it is possible to design the movable element with at relatively small width and height since the movable element does not require any substantial further components. The movable element may thus be given a low weight, which is an important advantage for a movable element describing a reciprocating movement.

According to a further embodiment of the invention, the movable element is connected to at least one piston, which is movably arranged in a housing. The electrical machine may in such way be utilised as an electrical generator, wherein the piston is moved in the housing by means of a combustion process in a manner known per se. The electrical machine may also be utilised as an electrical engine for driving a piston pump, for instance.

According to a further embodiment of the invention, the first machine unit includes a second movable element, which includes a number of permanent magnet elements and which is movable in a reciprocating movement in relation to the stator along a second movement path extending in parallel with the first movement path, and wherein the substantially closed winding path includes a second current carrying portion, which extends substantially in parallel with the second movement path. In such a way, a very large part of substantially closed winding path may be utilised for current generation, and thus the losses are kept at a very low level. Preferably, also the second movable element is connected to the piston. However, it is to be noted that the two movable elements may be connected to a respective piston, or more precisely to a separate piston at each end of the movable element. Furthermore, the first current carrying portion of the winding path is associated substantially with a first half of said magnetic flux conductors, and the second current carrying portion of the winding path is associated substantially with a second half of said magnetic flux conductors. Preferably, the permanent magnet elements of the first movable element are arranged to co-operate with the magnetic flux conductors that are associated with the first current carrying portion, and the permanent magnet elements of the second movable element are arranged to to co-operate with the magnetic flux conductors that are associated with the second current carrying portion.

According to a further embodiment of the invention, adjacent permanent magnet elements of said movable elements are separated from each other by an intermediate element, which is substantially magnetically non-conducting. Thereby, the permanent magnet elements and the intermediate elements of the movable element may be arranged to form a structure, which resists the forces acting on the movable element during the use of the electrical machine. Such a design may preferably have the shape of an elongated rod extending between and connecting two pistons. Such a rod may thus be constructed from merely permanent magnet elements and intermediate elements in an alternating configuration. Moreover, adjacent magnetic flux conductors of the stator may be separated from each other by an intermediate element, which is magnetically isolating.

According to a further embodiment of the invention, the electrical machine also includes a second machine unit, which includes a stator, which includes a plurality of magnetic flux conductors and an electric conductor forming a winding extending in a substantially closed winding path through each magnetic flux conductor, and at least one first movable element, which includes a number of permanent magnet elements and which is movable in a reciprocating movement in relation to the stator along a first movement path in a space having a finite length and being formed by at least some of said magnetic flux conductors, wherein the substantially closed winding path includes a first current carrying portion, which extends substantially in parallel with the first movement path, wherein each magnetic flux conductor is arranged to form, together with one of said permanent magnet elements, a closed magnetic flux circuit extending around said portion, and wherein the first machine unit is arranged to operate in a first phase position and the second machine unit is arranged to operate in a second phase position displaced from the first phase position by a phase angle.

By such a further machine unit, the electrical machine may be designed as a two phase machine, wherein the two machine units may be displaced from each other by a suitable phase angle, for instance 90°. It is to be noted, that it is of course possible to design the electrical machine with several phases, for instance three phases, wherein the electrical machine includes three such machine units. The different machine units may be arranged beside each other in such a way that the movable elements are moving in parallel to each other. Thereby, it is possible to connect the movable elements of the different machine units to one or two common pistons or two separate pistons for each machine unit.

BRIEF DESCRIPTION OF THE DRAWINGS

The present invention is now to be explained more closely by means of different embodiments, which are disclosed merely by way of example, and with reference to the drawings attached, in which FIG. 1 discloses schematically a cross-sectional view of a first embodiment of an electrical machine according to the invention.

FIG. 2 discloses another cross-sectional view of the machine in FIG. 1.

FIG. 3 discloses schematically a section along the line III—III in FIGS. 1 and 2.

FIG. 4 discloses schematically a section along the line IV—IV in FIGS. 1 and 2.

FIG. 12 discloses schematically a section similar to the one in FIG. 1 of an electrical machine according to a sixth embodiment of the invention.

FIG. 13 discloses another section of the machine in FIG. 12.

DETAILED DESCRIPTION OF DIFFERENT EMBODIMENTS OF THE INVENTION

Figure 5:
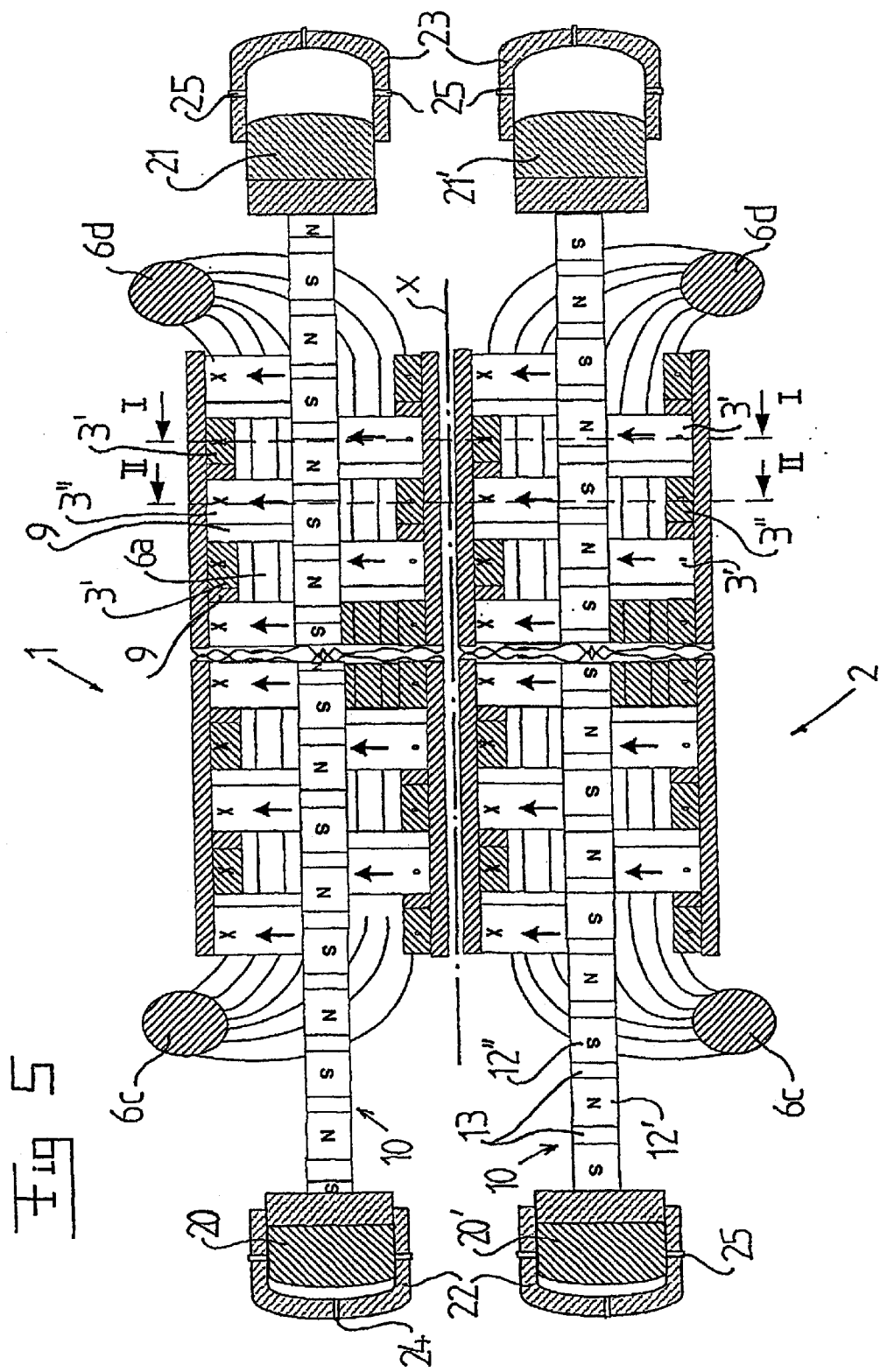
FIG. 5 discloses schematically a section similar to the one in FIG. 4 of second embodiment of an electrical machine according to the invention.

With reference to FIGS. 1–4, a first embodiment of an electrical machine with a first machine unit 1 and a second machine unit 2 is disclosed. The machine units 1 and 2 have a substantially identical design and we will therefore only describe the first machine unit 1 more closely.

The first machine unit 1 includes a stator, which includes a plurality of magnetic flux conductors 3', 3", 4', 4". The first machine unit 1 also includes an electric conductor forming a winding 6a, 6b, 6c, 6d, which may consist of one or several coils. The winding 6a, 6b, 6c, 6d forms a substantially closed path, which extends through each magnetic flux conductor 3', 3", 4', 4". The closed winding path forms an elongated ring having a first current carrying portion 6a and a second current carrying portion 6b. The first current carrying portion 6a extends through the magnetic flux conductors 3' and 3", and a second current carrying portion 6b extends through the magnetic flux conductors 4' and 4". The two current carrying portions 6a and 6b are substantially rectilinear and extend substantially in parallel to each other and to a longitudinal axis x of the first machine unit 1. The two portions 6a and 6b are connected to each other by means of two current carrying connecting portions 6c and 6d, which form a smooth curvature. Half of connecting portions 6c and 6d appear from FIG. 4.

The magnetic flux conductors 3', 3", 4',4", are provided in pairs, wherein the magnetic flux conductor 3' extends around the first current carrying portion 6a, and the magnetic flux conductor 4' extends around the second current carrying portion 6b. In the same way the magnetic flux conductor 3" extends around the first current carrying portion 6a, and the magnetic flux conductor 4" extends around the second current carrying portion 6b in an adjacent pair of magnetic flux conductors. The magnetic flux conductors in one such pair form an integrated unit of a magnetically conducting material. Thereby, the two magnetic flux conductors 3' and 4' include a common part 5, which extends between the two magnetic flux conductors and which includes a projecting part 5', which projects between the magnetic flux conductors 3' and 4'. The projecting part 5' forms a first end surface 7 of each of the magnetic flux conductors 3' and 4'. At a distance from and substantially opposite to said end surface 7, each magnetic flux conductor 3', 4' has a second and end surface 8. The adjacent magnetic flux conductors 3" and 4" are designed in a corresponding manner with a common part 5 and a projecting part 5", wherein the projecting part 5" extends in a opposite direction in relation to the projecting part 5'.

Preferably, the magnetic flux conductors 3', 3", 4', 4" are manufactured in a soft magnetic, sintered powder material, wherein each particle may be surrounded by an isolating layer. Such a material leads to small eddy current losses in particular at high frequencies. A powder material may also in a simple manner be formed to a desired shape in three dimensions. Between adjacent magnetic flux conductors, there is an intermediate element 9, which is magnetically non-conducting and electrically non-conducting. Each pair of magnetic flux conductors 3', 4' is thus separated from an adjacent pair of magnetic flux conductors 3", 4" by means of such an intermediate element 9, which appears clearly from FIG. 3.

The first machine unit 1 also includes two movable elements 10, 11. Each such movable element 10, 11 includes a number of permanent magnet elements 12', 12", and between each permanent magnet element 12', 12" and intermediate element 13. The permanent magnet elements 12', 12" and the intermediate elements 13 are provided in a rod-like configuration in such a way that these elements are arranged in a row after each other. The permanent magnet elements 12' has the north pole N directed in one direction whereas the adjacent permanent magnet element 12" has been north pole N directed in an opposite direction. The intermediate elements 13, which separates the adjacent permanent magnet elements 12', 12", are magnetically substantially non-conducting and electrically substantially non-conducting. The elongated movable elements 10 and 11 extend substantially in parallel to the longitudinal axis x and are arranged to move in a reciprocating movement in relation to the magnetic flux conductors 3', 3", 4', 4" along a first and second movement path, respectively, i.e. in parallel to the longitudinal axis x.

As appears from FIGS. 1, 2 and 3, the movable elements 10 and 11 are provided between the first end surface 7 and the second end surface 8 of a respective magnetic flux conductor 3', 3", 4', 4", and more precisely the permanent magnet elements 12', 12" are arranged between the end surfaces 7 and 8 in such a way that an air gap is formed between one pole of the permanent magnet elements 12', 12" and the first end surface 7, and an air gap between the other pole of the permanent magnet elements 12', 12" and the second end surface 8. Each magnetic flux conductor 3', 3", 4', 4" is thus arranged to form, together with one of said permanent magnet elements 12', 12", a closed magnetic flux circuit, which extends around one of the current carrying portions 6a and 6b.

The magnetic flux in each magnetic flux circuit will thus be parallel to a plane, which is substantially perpendicular to the longitudinal axis x, i.e. the direction of the two current carrying portions 6a and 6b as well as to the respective movement path of the movable elements 10, 11.

The distance between a centre point of adjacent permanent magnet elements 12', 12" is substantially equal to the distance between a centre point of adjacent magnetic flux conductors 3', 3", 4', 4". In the same way, the cross-sectional area of the end surfaces 7 and 8, and of the poles of the permanent magnet elements 12', 12" are substantially identical with regard to both the size and the shape. Seen over a certain length of the stator, it will include the same number of magnetic flux elements 3', 3", 4', 4" as the number of permanent magnet elements 12', 12" of the corresponding length of the movable element 10, 11.

As appears from FIGS. 1 and 2, the magnetic flux conductors 3', 3", 4', 4" are provided in an alternating order with regard to the direction of the magnetic flux in relation to the permanent magnet elements 12', 12" in the respective magnetic flux circuit. This means that the magnetic flux conductors 3', 3", 4', 4" are arranged in such a way that the direction of the magnetic flux in relation to the winding 6a, 6b, 6c, 6d, i.e. the first current carrying portion 6a and the second carrying portion 6d are substantially the same in each magnetic flux circuit at a static reflection. However, when the movable elements 10, 11 move one step from one magnetic flux conductor 3', 4' to an adjacent magnetic flux conductor 3", 4", the magnetic flux in each magnetic flux circuit 3', 3", 4', 4" will change direction, and consequently also the induced voltage in the winding 6a, 6b, 6c, 6d changes direction.

The permanent magnet elements 12', 12" and the intermediate elements 13 of the movable elements 10, 11 are arranged to form a construction, which can resist large forces acting on the movable elements 10, 11 during use. It is to be noted, that the movable elements 10, 11 in the embodiments disclosed do not include any further strengthening construction elements. However, it is possible to provide the movable elements 10, 11 with such strengthening construction elements, for instance elongated strengthening rods which are provided above and beneath the movable elements 10, 11 seen in FIGS. 1 and 2. Such elongated strengthening rods will not influence the electric or magnetic properties of the electrical machine since the air gaps between the magnet poles N, S and the end surfaces 7, 8 are not influenced. It is also advantageous to make the movable elements 10, 11 with a weight which is as light as possible, since they are to describe a reciprocating movement involving continuous accelerations, and therefore it is of course desirable to avoid too many further parts. The movable element 10, 11 may be manufactured by attaching permanent magnet elements 12', 12" and intermediate elements 13 to each other. It is also possible to magnetise parts of an elongated element in opposite directions in such a way that the structure disclosed is obtained.

In the embodiments disclosed, the movable elements 10, 11 are connected to pistons 20, 21. FIG. 3 discloses a common piston 20 for the two movable elements 10 and 11 at one end and another common piston 21 for the two movable elements 10, 11 at the other end. Each piston 20, 21 is movably provided in a cylinder housing 22 and 23, respectively. It is to be noted that it is also possible to provide each movable element 10, 11 with separate pistons at each end.

The electrical machine may be utilised for operating as a generator, wherein the cylinder housings 22, 23 form a respective expansion chamber for accelerating the piston 20, 21. A suitable application is disclosed in the Swedish patent application No. 9904733-4, which describes a combustion engine with an electrical machine for generating electric effect and for controlling the position of a piston of the combustion engine. The cylinder housings 22, 23 may in such a generator application include, for instance, inlet channels 24 for the feeding of a fuel or a fuel/oxidator mixture, and outlet channels 25 for the discharge of combustion gases. In the embodiment disclosed, the combustion chambers are arranged to operate according to the two-stroke principle, but it is of course possible within the scope of the invention also to utilise four-stroke engines. It is to be noted, that all types of combustion engines may be combined with the electrical machine and it is in particular pointed to the so-called HCCI-engines (Homogenous Charge Combustion Ignition), which may be regarded as a mixture between an Otto cycle engine and a diesel engine, wherein a mixture of oxidator and fuel is introduced into the combustion chamber and ignited at high compression through self-ignition. Also other types of piston engines are usable, for instance Stirling engines. It is also to be noted that the piston-cylinder arrangement at one end of the movable elements 10, 11 may be replaced by a spring arrangement, which is arranged to force the piston back to the other end, for instance for discharge of combustion gases or compression of a fuel-air-mixture. The electrical machine may also be utilised as an electric motor for driving a piston pump, wherein an inlet valve and an outlet valve (not disclosed) are provided at each cylinder housing 22, 23 for the feeding and the discharge of the medium to be pumped.

As appears form FIGS. 1, 2 and 4, the second machine unit 2 is arranged beside the first machine unit 1 in such a way that the movable elements 10, 11 are substantially parallel to each other. FIG. 4 illustrates how the permanent magnet elements 12', 12" of the movable elements 10, 11 of the first machine unit 1 may be displaced in relation to the permanent magnet elements 12', 12" of the movable elements 10, 11 of the second machine unit 2. In such a way one may obtain a phase displacement between the two machine units 1, 2, and thus it is possible with the two machine units disclosed in FIG. 4 to provide an electrical machine generating a two phase voltage. The phase angle may be selected as desired, for instance 90°. It is to be noted, that the electrical machine may be provided with a principally arbitrarily number of machine units, which may operate in partly the same or different phase positions.

In FIG. 4, the movable elements 10, 11 of the two machine units 1 and 2 are connected to a common piston 20 at one end and a second common piston 21 at the other end. In this embodiment there are thus four movable elements 10, 11, which co-operate with two common pistons 20, 21.

FIG. 5 discloses another embodiment of a two phase machine with separate pistons 20, 21 and 20', 21', respectively, for both the machine units 1, 2. For the rest, this embodiment is equal to the embodiment disclosed in FIGS. 1–4.

Figure 6:
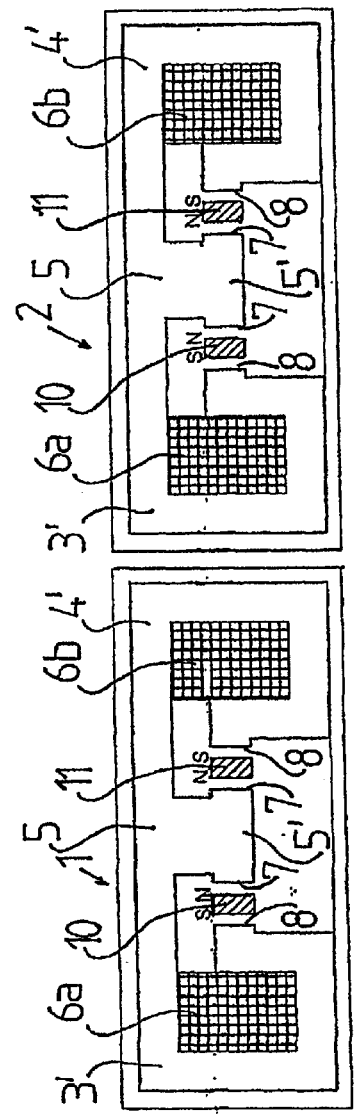
FIG. 6 discloses schematically a cross-sectional view of a third embodiment of an electrical machine according to the invention.
Figure 7:
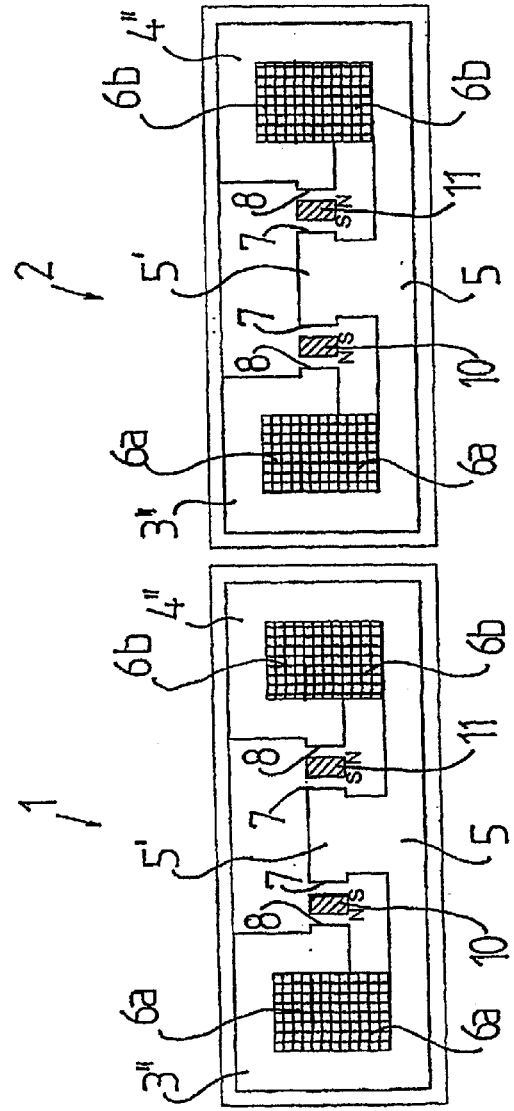
FIG. 7 discloses another cross-sectional view of the machine in FIG. 6.

FIGS. 6 and 7 discloses a further embodiment, which illustrates how the two machine units 1, 2 may be arranged beside each other laterally, i.e. the four movable elements 10, 11 include a common plane.

Figure 8:
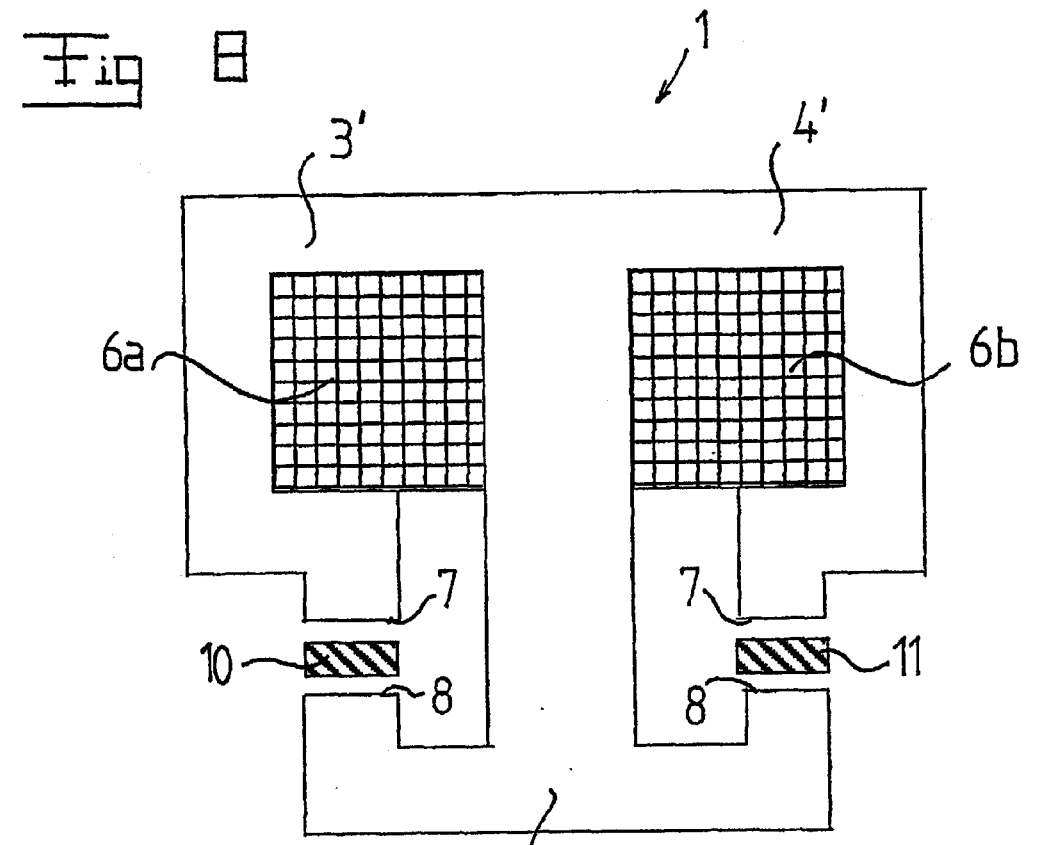
FIG. 8 discloses schematically a section similar to the one in FIG. 1 of an electrical machine according to a fourth embodiment of to the invention.
Figure 9:
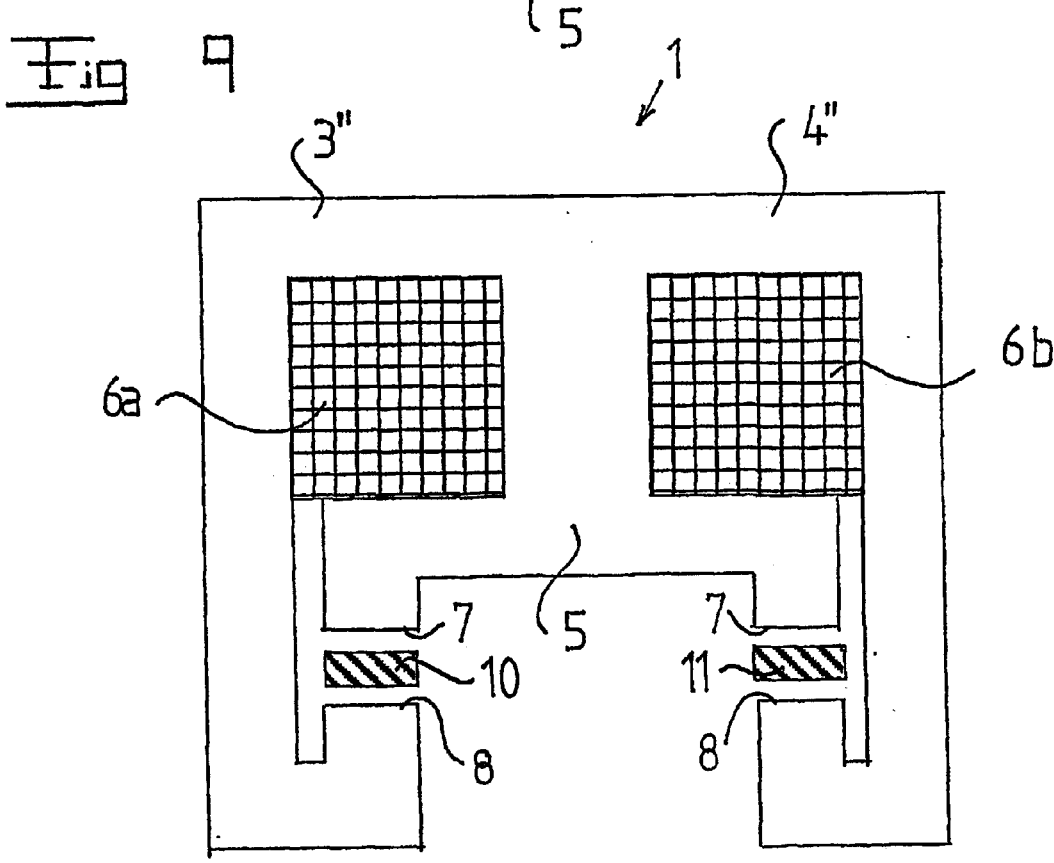
FIG. 9 discloses another cross-sectional view of the machine in FIG. 8.

FIGS. 8 and 9 discloses a fourth embodiment, which differs from the previous embodiments by the fact that the windings 6a, 6b are completely located beside the movable elements 10 and 11. In such a way, the connecting portions 6c and 6d do not need to be bended outwardly in the manner disclosed in FIG. 4.

Figure 10:
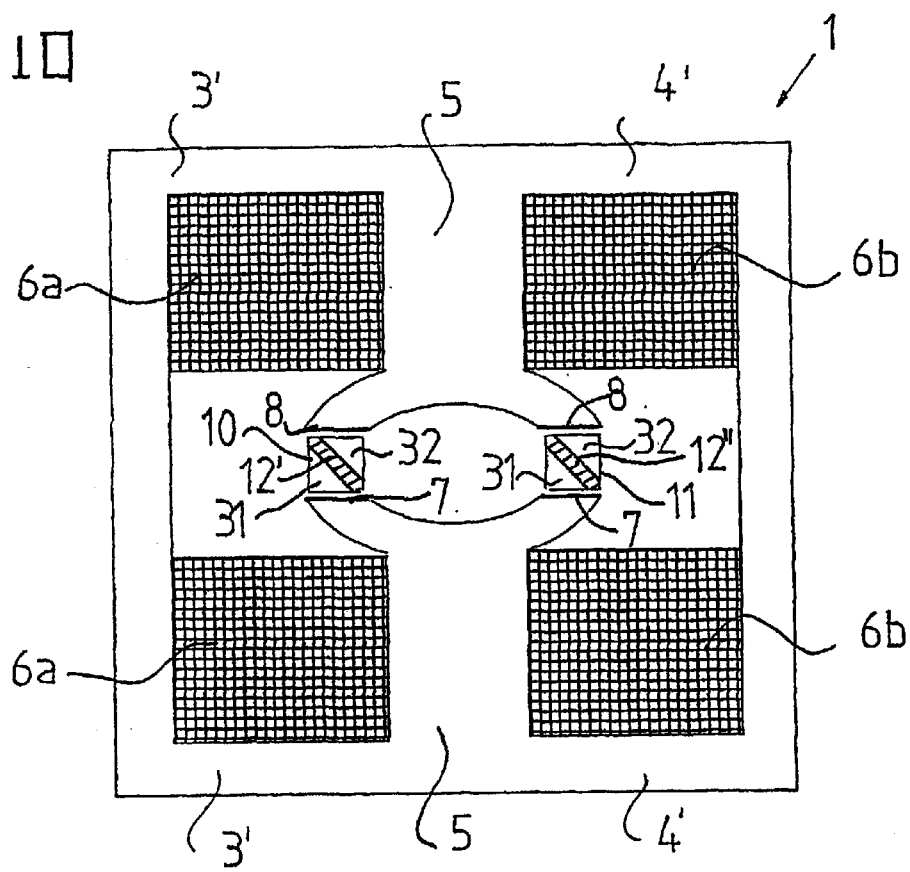
FIG. 10 discloses a section similar to the one in FIG. 1 of an electrical machine according to a fifth embodiment of the invention.
Figure 11:
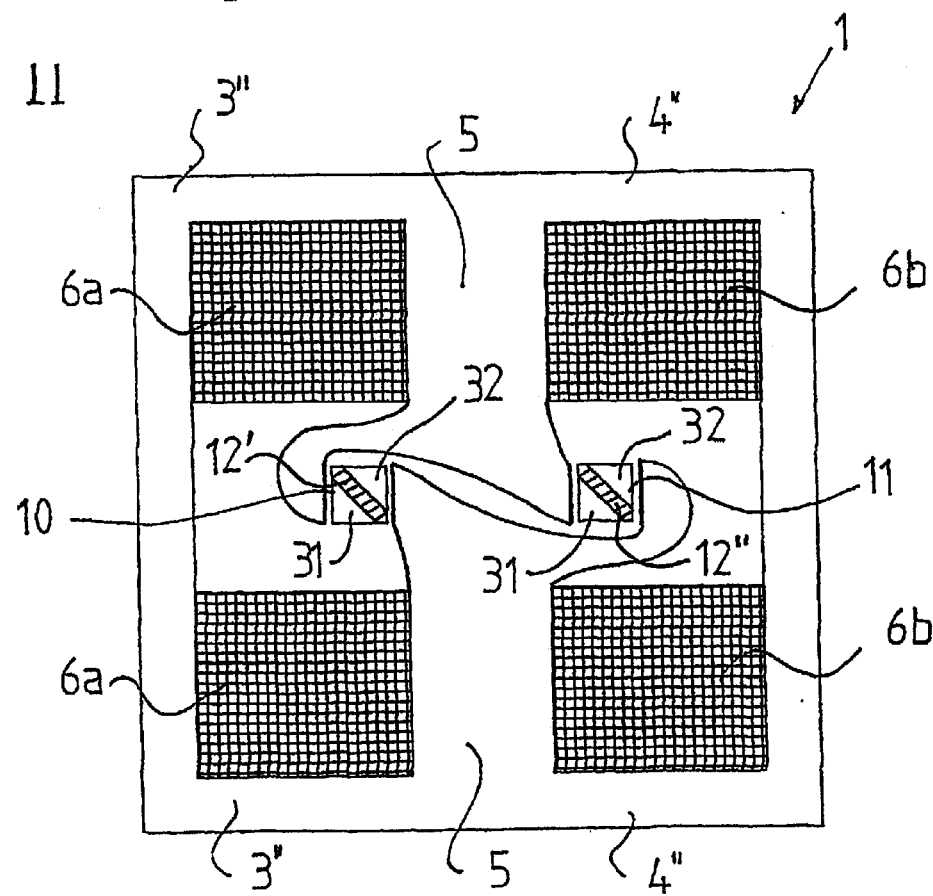
FIG. 11 discloses another section of the machine in FIG. 10.

FIGS. 10 and 11 discloses a fifth embodiment of the invention, which differs from the previous embodiments by the fact that the permanent magnet elements 12', 12" are inclined in relation to the direction of the magnetic flux approaching the permanent magnet element and leaving the same. In this embodiment, the movable elements 10 and 11 include magnetic flux conductors 31, 32 for conducting the magnetic flux through the movable element 10, 11 to and from the permanent magnet elements 12', 12". In the embodiment disclosed, all permanent magnet elements 12', 12" are inclined in the same direction. It is also possible to let the permanent magnet elements 12', 12" of one of the elements 10 be inclined in a first direction and the permanent magnet elements 12', 12" of the other element 11 in another direction extending substantially 90° in relation to the first direction.

FIGS. 12 and 13 discloses a sixth embodiment of the invention similar to the fifth embodiment, but where the magnet poles 7 and 8 are inclined by the same angle of inclination as the movable elements 10 and 11.

It is to be noted that components and elements having corresponding functions have been provided with the same reference signs in all embodiments.

The invention is not limited to the embodiments disclosed but may be varied and modified within the scope of the following claims.

The disclosed embodiments include rectilinear machines, i.e. the movement path for the movable elements 10, 11 is linear. However, it is possible to let these moving paths be curved. The essential is that the movable elements 10, 11 describe a reciprocating movement.

In the cross-sectional views disclosed in FIGS. 1, 2 and 6, the magnetic flux conductors 3', 3", 4', 4" have been disclosed schematically with sharp edges. However, it is to be noted that these elements 3', 3", 4', 4" advantageously may be designed with rounded corners, which improves the magnetic flux conducting capability.

What is claimed is:

1. An electrical machine operating according to the transversal including at least one first machine unit, which comprises:
    a stator, which includes a plurality of magnetic flux conductors and an electric conductor forming a winding extending in a substantially closed winding path through each magnetic flux conductor;
    a first movable element, which includes a number of permanent magnet elements provided in a rod-like configuration and which is movable in a reciprocating movement in relation to the stator along a first movement path in a space having a finite length and being formed by at least some of said magnetic flux conductors;
    a second movable element, which includes a number of permanent magnet elements provided in a rod-like configuration, and which is movable in a reciprocating movement in relation to the stator along a second movement path extending in parallel with the first movement path,
    wherein the substantially closed winding path includes a first current carrying portion, which extends substantially in parallel with the first movement path, and a second current carrying portion, which extends substantially in parallel with the second movement path,
    wherein the first current carrying portion of the winding path is associated substantially with a first half of said magnetic flux conductor, and the second current carrying portion of the winding path is associated substantially with a second half of said magnetic flux conductor,
    wherein the magnetic flux conductors of said first half is arranged to form, together with one of said permanent magnet elements of said first movable element, a closed magnetic flux circuit extending around said first current carrying portion,
    wherein each magnetic flux conductor of said second half is arranged to form, together with one of said permanent magnet elements of said second movable element, a close magnetic flux circuit extending around said second current carrying portion,
    wherein the magnetic flux conductors are arranged in an alternating order with respect to a direction of the magnetic flux in relation to the permanent magnet elements in the respective magnetic flux circuit, and wherein each magnetic flux circuit includes a first gap between a first pole of the permanent magnet elements of the circuit and an end surface of the magnetic flux conductor of the circuit, and a second gap between a second pole of the permanent magnet elements of the circuit and a second end surface of the magnetic flux conductor of the circuit.

2. An electrical machine according to claim 1, wherein each magnetic flux circuit includes a magnetic flux, which is in parallel with a plane extending substantially perpendicularly to the first movement path.

3. An electrical machine according to any one of claims 1, wherein the distance between a centre point of adjacent permanent magnet elements is substantially equal to a distance.

4. An electrical machine according to claim 1, wherein the permanent magnet elements are arranged in an alternating order with respect to the magnetic direction of the permanent magnet elements.

5. An electrical machine according to claim 1, wherein the magnetic flux conductors are arranged such that the direction of the magnetic flux in relation to the winding is substantially same in each magnetic flux circuit.

6. An electrical machine according to claims 1, wherein the first movable element is connected to at least one piston, which is movably arranged in a housing.

7. An electrical machine according to claim 1, wherein the second movable element is also connected to at least one piston.

8. An electrical machine according to claims 1, wherein the permanent magnetic elements of the first movable element are arranged to cooperate with the magnetic flux conductors that are associated with the first current carrying portion, and wherein the permanent magnet elements of the second movable element are arranged to cooperate with the magnetic flux conductors that are associated with the second current carrying portion.

9. An electrical machine according to claim 1, wherein adjacent permanent magnet elements of the movable elements are separated from each other by an intermediate element, which is substantially magnetically non-conducting.

10. An electrical machine according to claim 9, wherein the permanent magnet elements and the intermediate elements of the movable element are arranged to form a structure, which resists forces acting on the movable element during use of the electrical machine.

11. An electrical machine according to claim 1, wherein adjacent magnetic flux conductors of the stator are separated from each other by an intermediate element, which is magnetically isolating.

12. An electrical machine according to claim 1, further comprising a second machine unit, which comprises:
    a second stator, which includes a second plurality of magnetic flux conductors and a second electric conductor forming a winding extending in a second substantially closed winding path through each second magnetic flux conductor, and
    at least one further movable element, which includes a number of second permanent magnet elements and which is movable in a reciprocating movement in relation to the second stator along a third movement path in a space having a finite length and being formed by at least some of the second magnetic flux conductors,
    wherein the second substantially closed winding path includes a third current carrying portion, which extends substantially in parallel with the third movement path,
    wherein each second magnetic flux conductor is arranged to form, together with one of the second permanent magnet elements, a second closed magnetic flux circuit extending around the third current carrying portion, and
    wherein the first y machine unit is arranged to operate in a first phase position and the second machine unit is arranged to operate in a second phase position displaced from the first phase position by a phase angle.

* * * * *